Sept. 17, 1935.  W. ZIMMERMANN  2,014,513

APPARATUS FOR MAKING PRINTING SURFACES

Original Filed May 4, 1933

INVENTOR
WILLIAM ZIMMERMANN
BY
Warren S. Orton
ATTORNEY

Patented Sept. 17, 1935

2,014,513

UNITED STATES PATENT OFFICE 2,014,513

APPARATUS FOR MAKING PRINTING SURFACES

William Zimmermann, Forest Hills, N. Y.

Original application May 4, 1933, Serial No. 669,326. Divided and this application October 29, 1934, Serial No. 750,454

14 Claims. (Cl. 95—74)

This invention relates to improvement in the art of making printing surfaces by photography or for making photographic plates or films bearing patterns which are, in turn, transferred upon printing surfaces, and the process aspect of which improvement is described and claimed in my Patent No. 1,978,559, issued October 30, 1934 on my copending application Serial No. 669,326 filed May 4, 1933. The present disclosure constitutes a divisional application of said copending application and relates specifically to means for ruling certain areas or "grounds" with a single line screen effect in such manner that in the pattern the screen will not cross the boundary lines of figures, as, for example, leaves or petals of flowers, but will lie within said boundary lines or outlines. The result is that the outlines of the pattern are kept sharp in every detail, whereas, if the screen lines cross the pattern figure boundaries, the latter would be sawtooth in effect with surfaces lacking sharpness in the printing.

The invention will be described with reference to the accompanying drawing, in which Fig. 1 is a plan view illustrating a positive photographic plate of the pattern;

Figure 1:
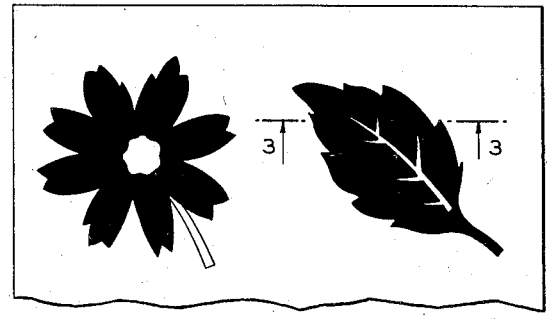

In practicing my method of obtaining a single line screen within desired figures of the pattern, or as a ground, and at the same time maintain the line screen a predetermined distance within the outline of the pattern figures or beyond the boundary of the figures when the screen is used as a background, I photograph the original copy according to the dry plate or wet plate method, whichever appears to be more suitable at the time according to regular photographic practice, and make a contact positive from the original negative. For purposes of illustration, I have shown such a positive in Fig. 1, the pattern for the purposes of simplicity, being a simple group of leaf and flower forms.

The second step following production of the positive, is to diffuse a second negative from the positive by placing the two members out of contact either by means of glass or one or more layers of transparent sheets such as celluloid, the spacing being that required by the degree of diffusion desired, the thicker the medium used between the positive and the sensitized negative sheet, the greater the distance between the boundary line of the figures and the line screen in the finished work.

Figure 3:
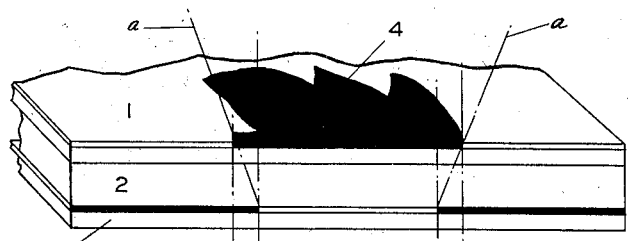
Fig. 3 is an enlarged perspective view of a portion of the positive plate shown in Fig. 1 (cut on the line 3—3), the latter having applied thereto a diffusion plate and a diffused negative.

In Fig. 3, I have shown the positive at 1, a diffusing plate at 2 and diffused negative at 3. It will be noted that the device 4 of the pattern, in this case the fragment of a leaf, has been so spaced from the negative plate 3, that the light rays indicated at $a$ have passed under the device 4, which normally would bar or shield the light so that its printing area has been reduced from the normal lines $bb$ to the more restricted lines $cc$. It will thus be seen that the image of each dark area on the positive will be reduced in area on the diffused negative.

Figure 4:
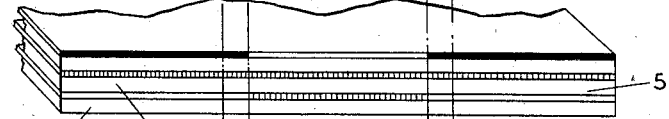
Fig. 4 is a view in edge elevation of the diffused negative in contact with a line screen and a sensitized film or plate.
Figure 5:
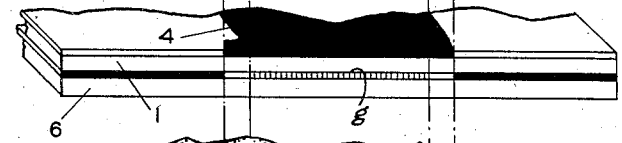
Fig. 5 is a view similar to Fig. 4 showing the positive plate applied to the sensitized film after the latter has received an exposure from the diffused negative and line screen.

After the diffused negative has been produced by the method above described, it is placed with a line screen in register with a sensitized plate or film. In Fig. 4 the line screen is indicated at 5 and the sensitized plate or film at 6. The light rays will pass through the pattern areas of the diffused negative and will pass to the sensitized film via the line screen so that in the sensitized film the restricted areas of the diffused negative will be ruled by the screen.

The third and final light exposure of the process is to obtain a second exposure of the sensitized film or plate by means of the positive 1. Referring to the lines $c$ and $b$, it will be seen that screen lines have been produced on the sensitized film within the boundary of the lines $c$ and the second exposure from the positive plate 1 will reproduce the device 4 in its full area upon the sensitized film surrounding the screen $g$ and the margins of the device 4 will lie beyond the screen a pre-determined and uniform distance at all points.

Figure 2:
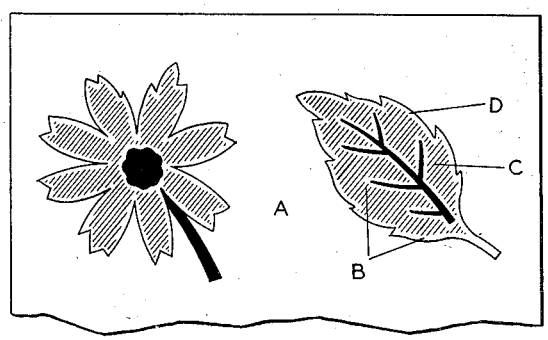
Fig. 2 is a plan view of the printing surface desired to be produced from said positive.
Figure 6:
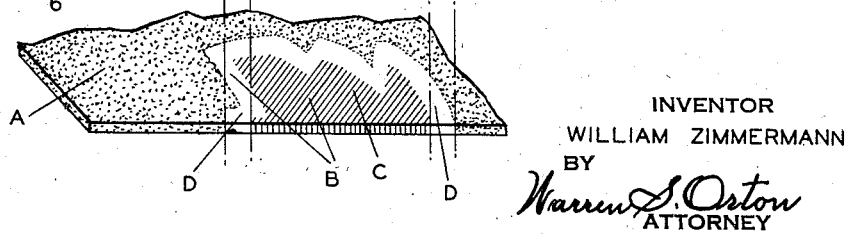
Fig. 6 is a perspective view of the twice exposed sensitized plate being the lower plate of Figs. 3 and 4 when completed.

The completed printing plate 6 as shown in Fig. 6 includes a light intercepted area A surrounding and forming the perimeter of the light affected area B which outlines the design 4 and within which light affected area is the partially light affected and partially light intercepted or screen area C spaced on all sides equidistantly from the perimeter of area B and thus leaving a thin margin of light affected and unscreened area or rather continuous line D. When the printing plate 6 is used as a light screen in the art of making printing surfaces by photography, or in making photographic plates or films bearing patterns which are, in turn transferred upon printing surfaces, it forms the negative of the desired printing surface with the corresponding parts similarly lettered as shown in Fig. 2.

The figures in the drawing are for the purposes of illustration only and intended to show in a simple and schematic manner, the operation of the process when it is desired to fill in certain areas of the design with a line screen, the method to be the same, however, when other than ruled effects are desired, as, for example, the ground or the figures are to compose dots or minute elements of any desired form.

It will be understood that in the application of the method, the sensitized member 5 may be a metallic printing member having a sensitized surface which when developed is transformed by the usual etching methods into a printing surface.

While there has been shown, described and pointed out in the annexed claims, certain novel features of the invention, it will be understood that various omissions, substitutions and changes in the form and details of the apparatus illustrated and in its operation may be made by those skilled in the art without departing from the spirit of the invention.

I claim:

1. A printing assembly comprising separable elements including a positive having a design pattern thereon, a negative of said positive and in which the design is of slightly reduced size from that on the positive, and is otherwise a facsimile of the positive pattern, and a screen, said elements adapted to be positioned on a sensitized member, and said sensitized member adapted to have positioned thereon in succession, first the negative and screen with the screen between the negative and the sensitized member, and then the positive alone, and in each case with the design patterns centered relative to a common point.

2. In a device of the class described, the combination with a positive having thereon a full size design pattern, of a diffused negative of said design of slightly smaller size, a screen underlying the diffused negative and said negative and screen adapted to be positioned over a sensitized member underlying the screen, and said diffused negative coacting with the screen and acting as a positive to produce on the sensitized member a screened reproduction in reduced size of the full size design on the positive.

3. A printing assembly formed of two superposed photographically produced members, the upper member provided with means presenting a light affected area forming an opaque design, the other member being partly exposed and provided with a light affected area the major portion of which is line striped to form a line screen ground, the line screen area being within and conforming to the projected outline of the design area, the lines forming the screen background terminating in a slightly spaced and uniform relation to the projected perimeter or boundaries of the opaque design area.

4. A multiple layer photographically formed composite member including an upper layer provided with a design forming area and a lower layer having a lined area forming a ground, the ground area conforming in outline to the design area but of slightly smaller dimensions than the design area, and said design area and ground area coacting to form a marginal line between the ground area and the resulting design area on a receiving surface when the member is subjected to light directed through the upper layer acting as a screen.

5. A multi-layer device for use in printing, comprising a layer having a photographically formed screen ground thereon forming a design, a positive layer superposed thereon and provided with an opaque portion having the same conformation of design as the ground but in slightly larger size, overlapping the screen ground and projecting slightly beyond all portions of the projected perimeter of the screen ground.

6. In a device of the character described, the combination with a positive having a design pattern thereon, of a printing assembly adapted to be positioned over a light sensitized member and comprising in superposed order, a screen and a positive having thereon a design pattern forming a facsimile of the design pattern on the first named positive but of slightly reduced size.

7. In a printing assembly, the combination of a positive having a full size design pattern thereon, and a member having thereon a facsimile of the pattern in slightly reduced size and formed of closely positioned characters forming a uniform screen, one design pattern being the negative of the other.

8. In a device of the class described, the combination in superposed order of an assembly comprising relatively thick transparent member and a positive having on the upper side thereof a design pattern, and said assembly adapted to be positioned on a sensitized member, said interposed transparent member adapted when light is projected downwardly through the positive and past all sides or edges of the design to form on the sensitized member a negative facsimile of the design on the positive except that it is of slightly reduced size from that of the positive.

9. A photographically formed printing member provided with a pattern and with a line screen ground and in which the lines of the screen lie entirely within the area of the pattern and thus do not cross or intercept the line or lines defining the perimeter or boundaries of the pattern.

10. A light affected member having formed thereon a solid relatively opaque background with a space within the background less dense than the background and forming a full size design pattern, a screen effect within the outlines of the pattern, forming a facsimile thereof and spaced from the outlining edges forming the design pattern, the space between the screen pattern and said outlining edges being free of light effects and thus forming a transparent marginal line between the screen and said outlining edges.

11. A photographically produced printing plate having a relatively opaque light affected area outlining a design, the design area provided with a line screen in which the lines forming the screen are in spaced relation to and do not contact with the relatively opaque area.

12. A printed surface constituting the positive of a photographically produced negative, said positive having a design pattern thereon and a screen within the outlines of the pattern, spaced slightly from the perimeter or boundaries of the pattern, and forming an unscreened marginal line between the screen and the perimeter of the pattern.

13. A printed surface constituting the positive of a photographically produced negative, said positive provided with means forming an outline of a design forming area, a line screen ground within said area, with the lines of the ground spaced from the boundary line of the area whereby the outlines of the design are kept sharp and saw tooth effects are avoided.

14. A printing device comprising a layer of material provided with means forming a design area and being opaque exteriorly of said area, a portion of said area provided with screen lines forming a facsimile of the design but of slightly smaller size whereby the facsimile is rendered partly opaque by the screen lines and partly transparent in the portions between the opaque forming lines.

WILLIAM ZIMMERMANN.